(12) United States Patent
Dandaleix

(10) Patent No.: US 9,517,590 B2
(45) Date of Patent: Dec. 13, 2016

(54) DEVICE FOR EXPELLING/CONTAINING LIQUIDS FOR A SPACECRAFT TANK

(71) Applicant: ASTRIUM SAS, Suresnes (FR)

(72) Inventor: Louis Dandaleix, Fonsorbes (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 97 days.

(21) Appl. No.: 14/352,536

(22) PCT Filed: Oct. 18, 2012

(86) PCT No.: PCT/EP2012/070657
§ 371 (c)(1),
(2) Date: Apr. 17, 2014

(87) PCT Pub. No.: WO2013/057193
PCT Pub. Date: Apr. 25, 2013

(65) Prior Publication Data
US 2014/0283936 A1    Sep. 25, 2014

(30) Foreign Application Priority Data
Oct. 18, 2011 (FR) ...................................... 11 03176

(51) Int. Cl.
*B29C 67/00* (2006.01)
*F02K 9/60* (2006.01)
(Continued)

(52) U.S. Cl.
CPC ........... *B29C 67/0077* (2013.01); *B64G 1/402* (2013.01); *F02K 9/605* (2013.01); *F17C 13/008* (2013.01);
(Continued)

(58) Field of Classification Search
CPC ......... B64G 1/401; B64G 1/402; F02K 9/605; F17C 13/008; F17C 2221/08; F17C 2201/0157; F17C 2223/0153; F17C 2201/0104; F17C 2270/0197; F17C 2270/0194; Y10T 29/49826
See application file for complete search history.

(56) References Cited

U.S. PATENT DOCUMENTS 3,744,738 A * 7/1973 Howard ................. B64G 1/402
222/414
4,397,408 A * 8/1983 Robert ................... B64G 1/402
222/394
(Continued)

FOREIGN PATENT DOCUMENTS

EP    0132175 A1    1/1985
EP    0434509 A1    6/1991
(Continued)

*Primary Examiner* — Mary McManmon
*Assistant Examiner* — Patrick Williams
(74) *Attorney, Agent, or Firm* — IM IP Law PLLC; C. Andrew Im

(57) ABSTRACT

A device for expelling/containing a predetermined liquid. The device configured to be built into a liquid tank operable at low or zero gravity and comprising a unitary three-dimensional sponge structure. The sponge structure comprises a set of substantially wire-like elements that extend between a peripheral area of the sponge structure and an area for expelling/containing liquid. The wire-like elements are substantially oriented in the direction of flow of the fluid within the device. The wire-like elements are connected together by crosspieces and are arranged such that the capillary gradient is positive or zero in the direction of flow of the fluid from the peripheral area to the area for expelling/containing liquid.

25 Claims, 7 Drawing Sheets

(51) Int. Cl.
 *B64G 1/40* (2006.01)
 *F17C 13/00* (2006.01)
(52) U.S. Cl.
 CPC . *F05D 2300/614* (2013.01); *F17C 2201/0104* (2013.01); *F17C 2201/0157* (2013.01); *F17C 2221/08* (2013.01); *F17C 2223/0153* (2013.01); *F17C 2270/0194* (2013.01); *F17C 2270/0197* (2013.01); *Y10T 29/49826* (2015.01); *Y10T 137/86348* (2015.04)

(56) References Cited

U.S. PATENT DOCUMENTS

| | | | |
|---|---|---|---|
| 4,553,565 A | | 11/1985 | Kerebel |
| 4,733,531 A | | 3/1988 | Grove |
| 4,901,762 A | * | 2/1990 | Miller, Jr. .............. B64G 1/402 137/574 |
| 5,071,093 A | | 12/1991 | Perdu |
| 5,111,856 A | | 5/1992 | Baralle |
| 5,293,895 A | * | 3/1994 | Grove ...................... F17C 9/00 137/154 |
| 6,342,092 B1 | * | 1/2002 | Lichon ............... B01D 19/0031 210/188 |
| 8,202,357 B2 | * | 6/2012 | Behruzi ................ B64G 1/402 96/204 |
| 2012/0298232 A1 | * | 11/2012 | Ekholm .................. F17C 13/04 137/599.01 |

FOREIGN PATENT DOCUMENTS

| | | |
|---|---|---|
| EP | 1868891 A2 | 12/2007 |
| FR | 2655956 A1 | 6/1991 |

* cited by examiner

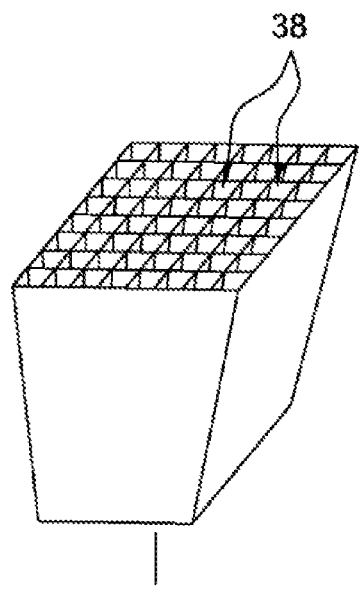
Fig. 5
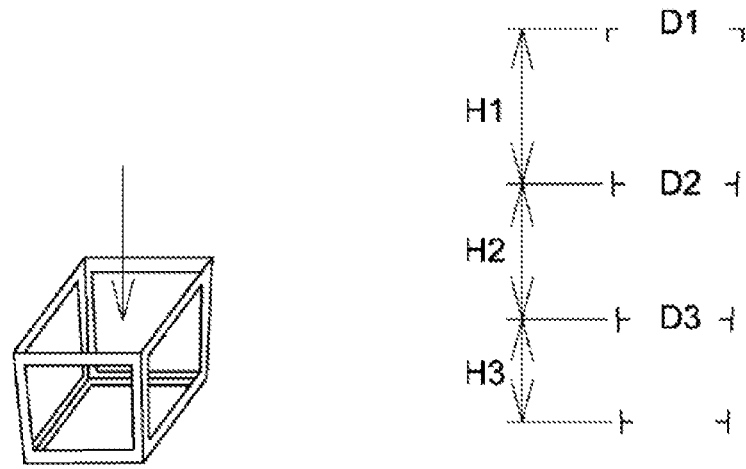
6A   6B

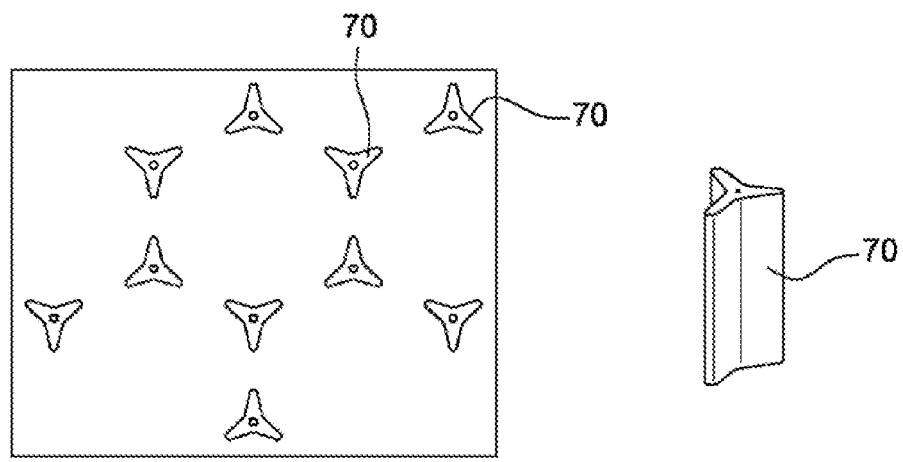
Fig. 9A     Fig. 9B
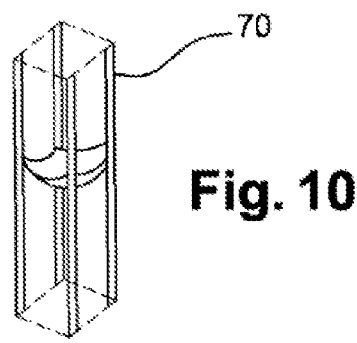
Fig. 10
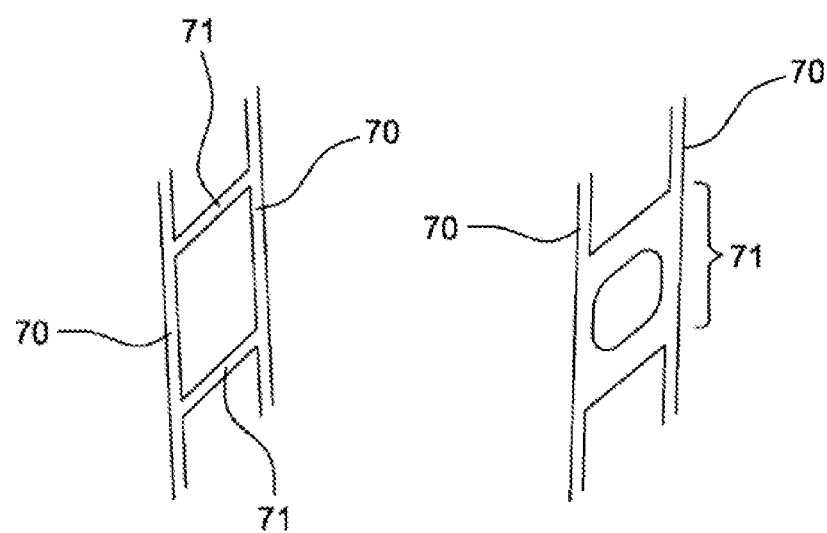
Fig. 11A     Fig. 11B

DEVICE FOR EXPELLING/CONTAINING LIQUIDS FOR A SPACECRAFT TANK

RELATED APPLICATIONS

This application is a §371 application from PCT/EP2012/070657 filed Oct. 18, 2012, which claims priority from French Patent Application No. 11 03176 filed Oct. 18, 2011, each of which is herein incorporated by reference in its entirety.

TECHNICAL FIELD OF THE INVENTION

The invention relates to the field of liquid tanks for spacecraft, notably the craft intended to travel at low or zero gravity.

It relates more particularly to a device for expelling/retaining liquid (denoted DEL) intended to be placed in a tank of liquid propellant for a spacecraft engine: satellite, probe, top launch vehicle stage, etc.

BACKGROUND OF THE INVENTION

Satellites and spacecraft frequently comprise liquid propellant thrusters for their high intensity thrust requirements. The liquid propellants intended to feed these thrusters are stored in tanks, the design of which has to take into account environmental conditions in which these craft are required to travel and notably an almost zero gravity, or a gravity substantially lower than the Earth's gravity variably oriented.

In such a tank, a propellant in liquid phase, contained in the tank, has to be able to be dispelled through an exhaust orifice. Generally, the tank contains both a propellant in liquid phase and gases (propellant vapors, inert pressurizing gas). The liquid expulsion device has to favor the expulsion of liquid from the tank through the evacuation orifice, while preventing the output through this orifice of the gases present in the tank, which could be detrimental to the correct operation of the propulsion system (risk of explosion).

Now, the absence of a constant direction of gravity enabling the liquid to collect at a low point prevents the use of traditional devices for liquid recovery and separation from gas bubbles.

In other, so-called "cold gas", satellite propulsion systems, a fluid is stored in a tank in diphasic state. The tank is heated to generate gas, which is discharged through piping and released at nozzles, thus creating a thrust on the satellite. Unlike the preceding systems in which liquid had to be expelled without bubbles, here it is necessary to discharge gas without droplets. The issue is then how to retain the liquid in the tank, by using a liquid retention device.

Various liquid expulsion or retention devices have therefore been designed to remedy this problem. Prior art in this field that can be cited includes the European patent EP 0 132 175 B2, published on Jan. 23, 1985, from the company Matra, which deals with a liquid storage tank with capillary containment.

Another patent that can be cited is FR 2 655 956 from the SociétéEuropéenne de Propulsion, published on 21 Jun. 1991 which targets a tank with shell capillary effect.

Finally, the patent EP 1 868 891 from Astrium SAS published on 26 Dec. 2007 describes the use of a liquid retention device used in a cold gas propulsion system.

According to the prior art, the core of the liquid expulsion or retention devices generally consists of a capillary structure, called sponge, whose function is to retain the liquid by capillarity when operating in conditions of weightlessness when the satellite is placed in its orbit. This sponge is placed close to the liquid propellant discharge orifice and communicates with this orifice.

The sponge of the liquid expulsion/retention device has a volume that is sufficient to retain a quantity of liquid propellant that is at least equal to, and generally greater than, a predetermined quantity. In the case of an expulsion device this predetermined quantity is the quantity needed to carry out a type of maneuver during which the propulsion system has to operate continuously for a predefined duration, even though the acceleration applied to the tank during said maneuver is applied in a direction such that the liquid propellants are not necessarily pressed toward the bottom of the tank in which the liquid discharge orifice is situated. Between two such maneuvers, the craft is once again at zero gravity, and the sponge is recharged with liquid while discharging the gas which is located therein.

In a prior art arrangement, illustrated by FIG. 1, the sponge of a liquid expulsion/retention device is made up of a large number of blades 11, for example metallic, arranged to offer a capillary gradient in a direction favoring the expulsion of the liquid through a liquid extraction orifice 12, provided for this purpose.

A quantity representative of the capillarity at a point of the sponge is the mean curvature of the free surface between liquid and gas at this point. Capillary gradient in a given direction should be understood to mean the spatial derivative of the capillarity in that direction. A positive gradient in a given direction means that the capillarity increases in that direction. When the gravitational or acceleration forces are weak, the liquid contained in this sponge tends naturally to move toward the area of strongest capillarity, in the direction in which the capillary gradient is positive, unlike the gas which tends naturally to move toward the zone of weakest capillarity, in the direction in which the capillary gradient is negative. The liquid extraction orifice 12 is arranged in immediate proximity to the zone of maximum capillarity of the sponge, called "expulsion/retention zone". The zone of the device through which the gas can escape is a so-called peripheral zone, generally far from the liquid expulsion/retention zone.

The blades 11, which can be planar or corrugated, can be arranged radially in such a way as to converge toward the center of the tank 10, thus creating a capillary gradient in that direction. The liquid is then collected in the central part of the tank and routed by capillarity toward the liquid discharge orifice.

In another example, illustrated by FIG. 2 the blades 11 are arranged fanwise within a housing 20. They are arranged substantially in the direction of the axis of the tank (called vertical direction and denoted Z) in a way such that they come closer together as they approach the liquid extraction orifice 12.

The limitations of the sponges of blade-based liquid expulsion/retention devices, as illustrated in FIGS. 1 and 2 in particular, and of other devices of this type according to the prior art, are manifold.

- Obtaining a good capillary pressure requires the blades to be sufficiently close together (typically 1 to 5 mm) which requires a large number of blades (typically a hundred or so).
- The geometrical tolerances imposed on fitting of the blades are restrictive (typically less than 0.5 mm).
- Assembling this large number of parts according to the prior art (for example by welding) with restrictive tolerances is difficult to perform and costly.

The type of parts used to produce the sponge according to the prior art limits the design possibilities for this kind of device.

OBJECTIVES OF THE INVENTION

One objective of the invention is to propose a novel type of sponge for a liquid tank intended to be used at zero or very low gravity.

SUMMARY OF THE INVENTION

To this end, the invention firstly targets a device for expelling/retaining a predetermined liquid, suitable for integration in a liquid tank intended to operate at low or zero gravity, said device comprising a so-called peripheral zone and a so-called liquid expulsion/retention zone. The device comprises a single-piece three-dimensional structure called a sponge comprising a set of substantially wire-like elements, called wire elements, extending between said peripheral zone of the sponge and said liquid expulsion/retention zone, said wire elements being substantially oriented in the direction of flow of the fluid within the device.

By way of indication, the typical volume of such a device for use onboard satellites is between 0.5 liter and 5 liters for a typical overall dimension of between 10 cm and 100 cm.

"Wire elements" should be understood here to mean structural elements that are relatively elongated in a given direction, the section of these elements being able to be of simple convex form, or else of more elaborate form, for example non-convex. It is also understood that these wire elements can be equally rectilinear or curvilinear. In the present description, these wire elements are rigid, in that they retain their form under gravity-linked stresses.

In order to favor the progression of the liquid in the expulsion/retention zone and the repulsion of gas bubbles from this zone, toward the peripheral zone, these wire elements are arranged in such a way that the capillary gradient of a fluid arranged within just these wire elements is positive or zero in the direction of flow of the fluid from said peripheral zone to said liquid expulsion/retention zone. Capillary gradient at a given point of the sponge and in a given direction should be understood to mean the spatial derivative, at this point and in this direction, of the mean curvature of a free liquid-gas separation surface passing through this point.

For example, the wire elements are arranged in such a way that the distance between any pair of close wire elements decreases in the direction of flow of the fluid from said peripheral zone to said liquid expulsion/retention zone. This distance is measured along the wire elements like the length of a segment linking two points of said wire elements, said segment being substantially orthogonal to said wire elements. The decrease in the distance between close wire elements can be continuous. It can also be discontinuous (in stages), optionally being zero along all or part of the wire elements.

The wire elements are advantageously arranged as a network, in as much as the intersections of the wire elements with surface plies orthogonal to said wire elements, are situated at the vertices of a polygonal paving of said surfaces. In other words, for at least part of the surfaces at right angles to the wire elements, the points corresponding to the intersections of these wire elements with this surface determine, two by two, the sides of polygons then forming a paving of said surface.

In the most commonplace cases, regular pavings of squared (grid) or hexagonal (honeycomb) type can be considered. However, there is nothing to prevent more complex or irregular pavings from being considered.

The typical section of a wire element is a convex surface of 0.05 to 1 mm$^2$, this surface corresponding to substantially cylindrical wire elements with a diameter of 0.2 mm to 1 mm.

The wire elements are spaced apart from one another by a distance suitable for creating, between these wire elements, forces of capillarity that are sufficient to retain the liquid (and/or expel the gas). This distance depends generally on the fluid concerned, in particular on its surface tension and on its capacity for wetting the surface of the structure. A typical distance between two close wire elements is between 1 mm and 5 mm.

The wire elements can be linked at their ends to structural elements of the device, such as gratings, covers or housings, so as to ensure the mechanical strength of the assembly, the whole forming a single-piece three-dimensional structure.

In this case, it will be advantageous for the wire elements to have a non-convex section, suitable for rigidifying them, for example a T, X or Y section.

So as not to disturb the trend of the capillary gradient within the sponge, it will be advantageous for the wire elements to have a section including protuberances extending along the sides (as defined above) of said polygons forming the polygonal paving of the network of wire elements. For example, for a grid, the section can be T or X, the branches of the T or of the X extending along the grid. For a honeycomb network, the section can be Y, the branches of the Y extending along the edges of the hexagons of the honeycomb.

In order to improve the mechanical strength and the rigidity of the device while minimizing its weight, the wire elements can be linked together by spacers (within the sponge itself).

In this case, from the moment when the spacers, by their placement and by their number, can ensure the mechanical strength and the rigidity of all of the wire elements, the latter are not necessarily linked to their ends to particular structures. The single-piece three-dimensional structure may then consist only of the wire elements and of the spacers linking these elements. This structure can then be angled and incorporated as a part independent of the rest of the liquid expulsion/retention device.

The spacers induce, very locally (typically over the distance of a half-section of spacers), capillary peaks that can create negative capillary gradients. In other words, the liquid tends to be retained at the intersections of the wire elements and of the spacers. It is therefore advantageous for these spacers to be arranged in such a way as to minimize the capillary peaks occurring along the wire elements at the points where said spacers are located.

In order to minimize these capillary peaks, in the case of polygonal paving, it is advantageous for the projections of the spacers, parallel to the direction of the wire elements, on the surface plies orthogonal to the wire elements, to be approximately merged with the sides of the polygons forming the polygonal paving of the network of wire elements.

Still with a view to minimizing the capillary peaks, it is advantageous for the spacers not to be orthogonal to the wire elements, but for the angle between the spacers and the wire elements to be typically between 20° and 70°.

In order to minimize the weight of the sponge, the spacers are advantageously wholly or partly substantially wire-like structural elements. "Substantially wire-like" should be understood to mean an elongate form with a length that is several times greater than the width, for example 10 times greater, the section being convex and circular for example. They can be rectilinear or curvilinear.

If there is a need for greater mechanical strength, it may be advantageous for all or some of the spacers to be plates linking the wire elements, said plates possibly being holed. "Plates" should be understood here to mean two-dimensional elements, with a length and a width that are several times greater than the thickness, for example 10 times greater. "Holed" should be understood to mean the fact that these two-dimensional surfaces have one or more through openings at right angles to their surface.

In the areas of the device where the spacers are substantially wire-like, it is advantageous for the distance between two consecutive spacers to decrease when moving in the direction of flow of the fluid from said peripheral zone to said liquid expulsion/retention zone. This way, a gas bubble which might remain jammed in the cell contained between the close wires and two spacers will be able to be evacuated more easily to the immediately adjacent cell, and in the opposite direction to the liquid flow.

Preferentially, these wire elements and these spacers form a set of lateral facets each delimited by segments of wire elements and of spacers, the perimeter of the facets associated with a given wire element decreasing along this wire element toward the catchment zone, in a direction called capillary gradient direction.

Facet should be understood to mean a succession of segments of wire elements and of spacers forming a closed outline, this succession being such that no pair of non-adjacent vertices is linked by a segment of wire element or of spacer. There are therefore facets that cannot be subdivided into two subfacets.

The term wire element is used here in a general manner, it being understood that it covers both rectilinear and curvilinear wire elements.

As explained, the device favors the progressive displacement of the liquid in the direction of the discharge orifice from the tank, and its single-piece construction enhances its rigidity and its simplicity of installation.

The direction in which the wire elements run from the peripheral zone to the liquid catchment zone is a direction in which the capillary gradient is positive.

According to a particular embodiment, the lateral facets determine polyhedral cells, each polyhedral cell having an elongate tubular form, of square or rectangular section, connected cells associated with one and the same wire element having a section which narrows in the direction of gradient.

More particularly, at least some of the spacers have a planar strip segment form, the sponge comprising superposed layers of cells, following one another in the direction Z of capillary gradient, openings being present in two opposite faces of each said cell, said faces being substantially at right angles to the direction Z of capillary gradient.

In other words, the sponge is, here, a set of polyhedral cells pierced with openings, said cells and openings being dimensioned to determine a capillary gradient in a predetermined direction.

Even more particularly, the dimension of the successive cells, measured in a direction X transversal to the direction Z of capillary gradient, decreases in the direction of capillary gradient. It will be understood that here it concerns the width of the facets, this width being measured in a direction at right angles to the direction of capillary gradient.

According to a favorable embodiment, the cross sections of each cell in a plane XY, transversal to the direction Z of capillary gradient, are of convex form, the diameter of the circles inscribed in these sections decreasing in the direction of capillary gradient. In this embodiment, the edges are increasingly close together according to at least one dimension on nearing the catchment zone, and the facets at right angles to these edges are therefore of increasingly small section, thus contributing to generating a capillary gradient.

According to another embodiment of a capillary gradient, the dimension $H_1, H_2, \ldots, H_n$, called "height" of the facets associated with one and the same wire element, measured in the direction Z of capillary gradient decreases when moving in that direction. In this embodiment, possibly combined with the preceding embodiment, the capillary gradient is produced by progressively decreasing the height of the lateral facets of the cells.

According to a preferred embodiment, the spacers are arranged between the wire elements along two so-called "vertical" planes XZ and YZ, these spacers being configured as stick segments, each form with the wire elements with which they are associated, an angle close to 45°. This arrangement is favorable to a simple production of the sponge by selective laser melting method.

In this case according to a particular embodiment, the spacers form superposed broken lines:
  in the vertical plane XZ, called longitudinal, with a same "height" in the direction of capillary gradient Z, one longitudinal spacer in every two being oriented in the direction +X+Z and one longitudinal spacer in every two being oriented in the direction +X−Z,
  in the vertical plane YZ, called lateral, with a same "height" in the direction of capillary gradient Z, one lateral spacer in every two being oriented in the direction +Y+Z and one lateral spacer in every two being oriented in the direction +X−Z.

Even more particularly in this case, the longitudinal spacers and the lateral spacers are not attached at the same height to the wire elements, each lateral spacer being attached to a wire element substantially at mid-distance between the fixing points of the two most adjacent longitudinal spacers.

It will be advantageous to manufacture the single-piece three-dimensional structure from a single piece according to a powder-based rapid manufacture method, for example powder bed or sputtering melting/sintering.

In the case where this single-piece three-dimensional structure is securely attached to other structural elements of the device with which it forms a single piece, it is advantageous to manufacture the whole according to a fast manufacturing method, for example powder-based.

In one of these preferred embodiments, the device comprises a single-piece three-dimensional structure called a sponge (32) comprising a network of substantially wire-like elements (called wire elements) extending between the peripheral zone of the sponge and the liquid expulsion/retention zone, the wire elements being substantially oriented in the direction of flow of the fluid within the device, these wire elements being linked together by spacers, these wire elements being arranged such that the capillary gradient is, in the absence of spacers, positive or zero in the direction of flow of the fluid from said peripheral zone to said liquid expulsion/retention zone, this structure being manufactured from a single piece according to a fast powder-based manufacturing method.

The invention targets, under a second aspect, a method for manufacturing a liquid expulsion device as explained. In this method, the sponge is manufactured by a fast powder-based, layer-by-layer manufacturing method, of the type known in the literature by the generic name of Layer Manufacturing (LM) (or even: Additive Manufacturing, Selective Laser Sintering, Selective Laser Melting, Rapid Prototyping, Direct Digital Manufacturing, 3D printing), the method comprising the following steps:

step 100: a three-dimensional digital description of the sponge to be produced is generated and entered into the memory of an SLM machine, step 200: the sponge 32 is broken down by software into a superposition of layers of predetermined thickness, step 300: the sponge 32 is manufactured layer by layer, substep 310: for the first layer, a powder of a material chosen according to the type of liquid to be stored in the tank is poured onto a planar substrate, substep 320: a moving laser solidifies, by melting, the design of the piece, as seen in cross section at the level of this layer, the rest of the powder being unchanged and remaining in place, substep 330: a new layer of powder is poured onto the previous layer, and so on, iteratively, until the final height of the sponge 32 is reached, the wire elements 70 are manufactured in the vertical direction Z corresponding to the direction of gravity on the ground, substep 340: once the piece is completely formed, the unsolidified powder is removed, thus revealing the single-piece sponge, step 400: the sponge 32 is then separated from its substrate.

Advantageously, the arrangement of the wire elements and those of the wire spacers during the manufacture are such that no wire element and no wire spacer is at right angles to the direction of manufacture.

Preferably, the wire elements are manufactured in such a way that they are formed by being arranged substantially in the direction of manufacture, and the angle between the wire spacers and the wire elements is at least a few degrees different from 90°. "A few degrees" should be understood to mean a difference typically between 5° and 15°.

According to a preferred embodiment, the method also comprises a following step: step 500: of cleaning of the sponge by ultrasound treatment.

In this case, more particularly, the sponge is subjected to five successive passes in an ultrasound cleaning device, implemented by immersion in a bath of isopropyl alcohol and water.

In a particular embodiment, in the step 200, the digital model of the sponge to be manufactured is complemented in its bottom part by a series of small thin vertical supporting columns, a few millimeters high. These small columns allow for easy separation from the substrate.

According to a preferred embodiment, the method also comprises a step of separation from the substrate performed by sawing.

Advantageously, the size of the powder grains used for manufacturing has a substantially typical dimension of 20 to 50 microns.

In another aspect, the invention targets a liquid tank intended to operate at low or zero gravity, comprising a liquid retention/expulsion device as explained.

The invention also targets a satellite, comprising a liquid retention/expulsion device as explained.

BRIEF DESCRIPTION OF THE FIGURES

The aims and advantages of the invention will be better understood on reading the description and drawings of a particular embodiment, given as a nonlimiting example, and for which the drawings represent:

FIG. 5: a perspective view of a capillary structure of a device as described, in a variant using tubular cells;

FIG. 6: exemplary cell configurations that can be used in a device according to the invention;

FIG. 9: a diagram showing a local cross section of the wire elements on a cross-sectional surface at right angles to said elements in another embodiment, and a perspective view of a wire element in this case;

FIG. 10: a diagram illustrating a form of liquid-gas interface within the device;

FIGS. 11*a* and 11*b*: two diagrams showing the configuration of a spacer linking two wire elements respectively in two embodiments;

DETAILED DESCRIPTION OF AN EMBODIMENT OF THE INVENTION

Before beginning to describe the invention, it should be noted here that the figures are not to scale.

Hereinafter in the description, the acronym DEL is used for simplicity to denote the liquid expulsion/retention device.

Figure 1:
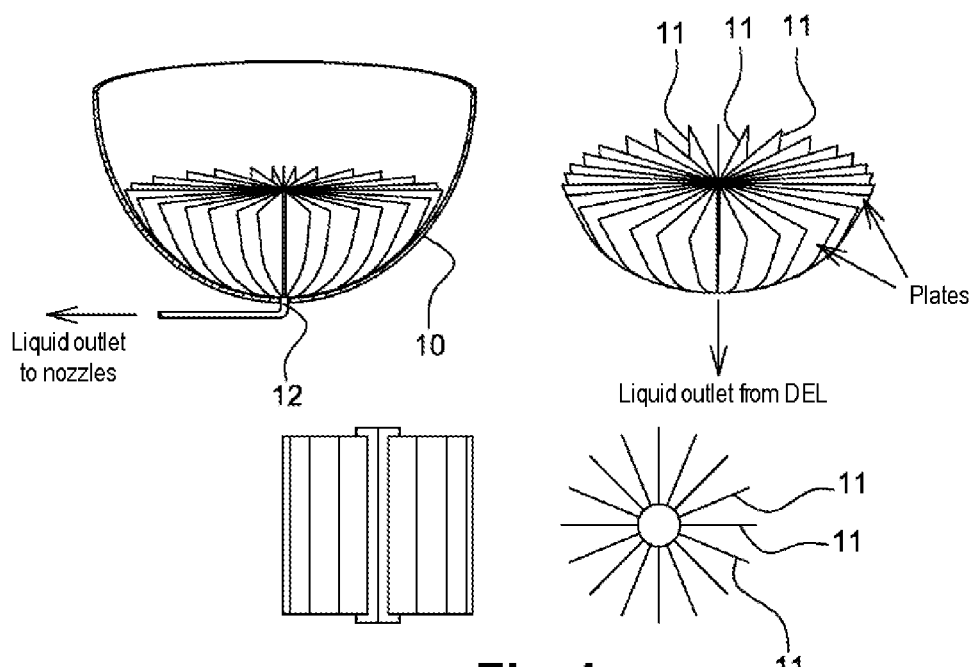
FIG. 1 (already cited): a schematic illustration of a first liquid expulsion device according to the prior art.
Figure 2:
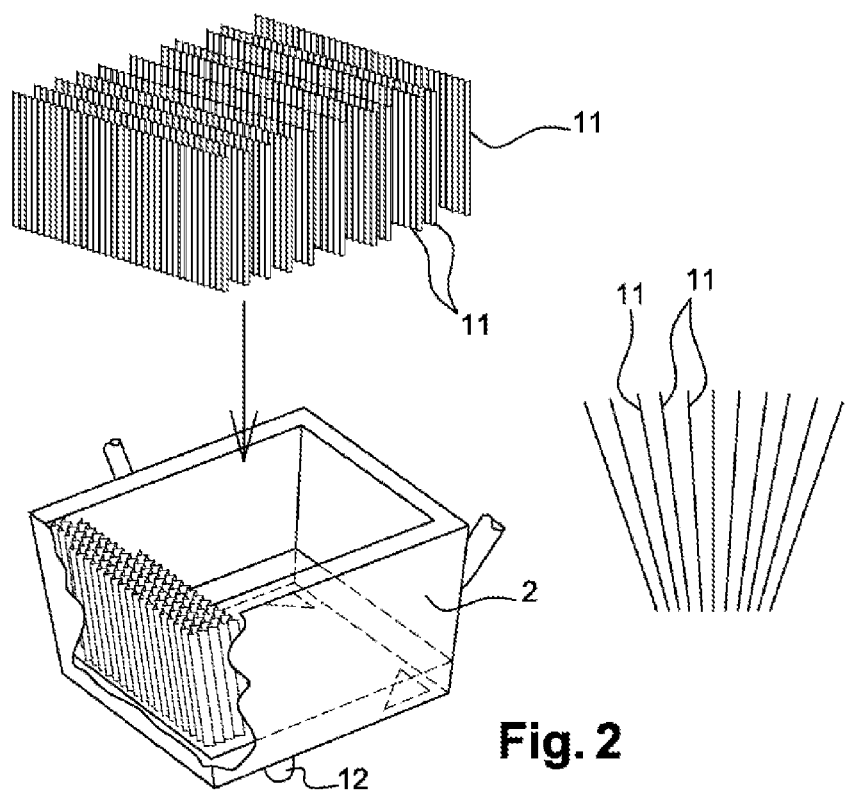
FIG. 2 (already cited): a schematic illustration of a second liquid expulsion device according to the prior art.
Figure 3:
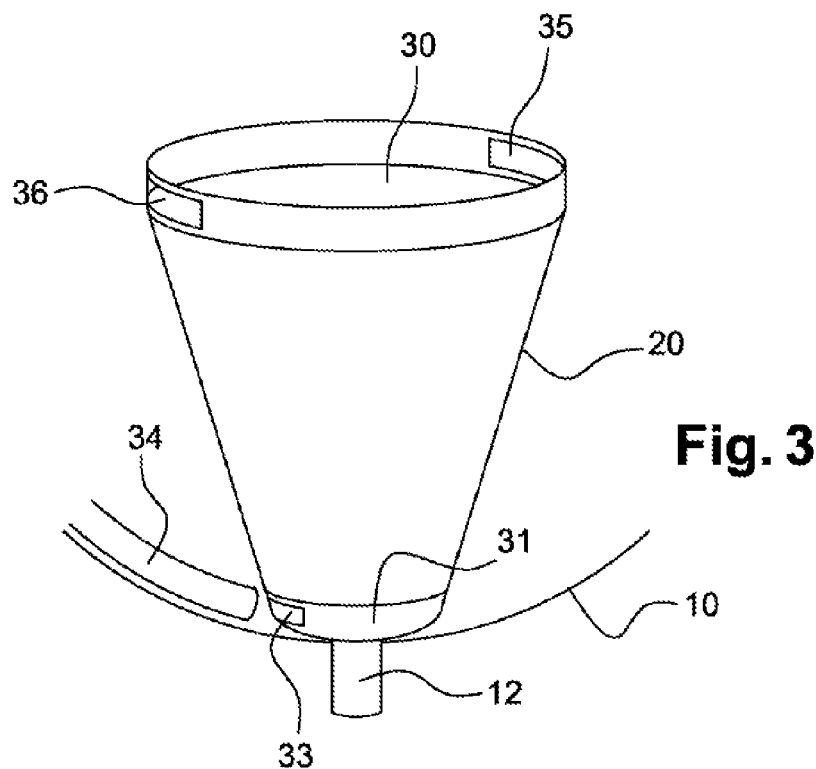
FIG. 3: a schematic illustration seen in perspective of a liquid expulsion device in an embodiment of the invention.
Figure 4:
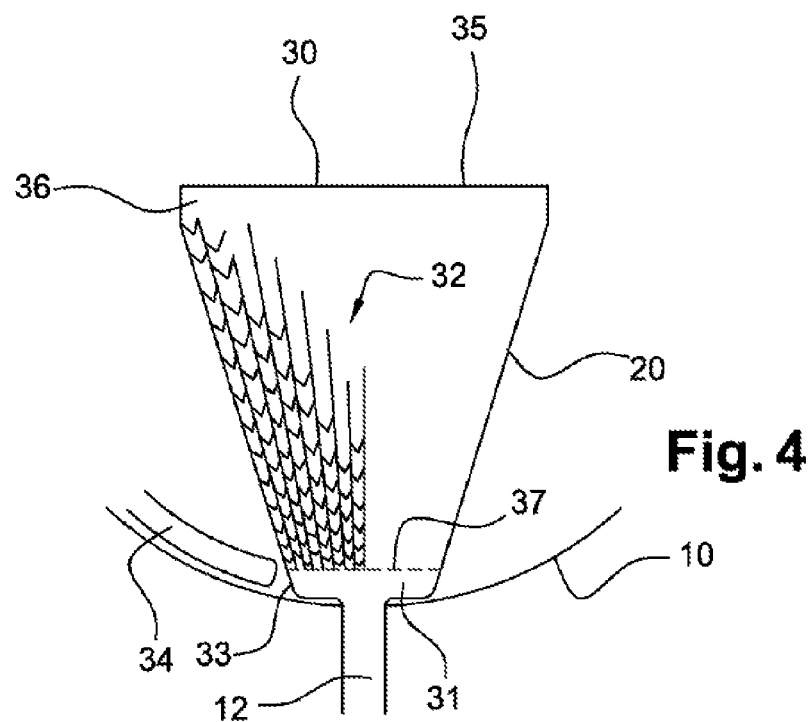
FIG. 4: a simplified diagram seen in cross section of the liquid expulsion device of FIG. 3, in a first embodiment of the device.

In a nonlimiting embodiment of the invention illustrated by FIGS. 3 and 4, the sponge 32 of a liquid expulsion/retention device is arranged in a housing 20, called retention housing, here metallic. This housing 20 is arranged within a liquid tank 10; for example of spherical form. The housing 20 is here of substantially frustoconical form, with a face away from the wall of the tank called cover 30, of substantially planar form. The face opposite the cover 30, placed in immediate proximity to the wall of the liquid tank 10, is called base 31 of the liquid expulsion/retention device. This base 31 corresponds to the liquid extraction zone when using the DEL. A liquid extraction orifice 12 is arranged substantially facing the center of this base 31.

In this housing 20, one or more liquid inlet orifices 33 are formed, through which the sponge is recharged with liquid. These liquid inlet orifices 33 are formed in the base 31 of the DEL. They here take the form of gratings. These liquid inlet orifices 33 are usually placed facing supply blades 34, securely attached to the internal face of the tank 10. The form of these supply blades 34 is known per se, and an embodiment thereof is, for example, described in the European patent EP 0 132 175, already mentioned.

The housing 20 also comprises one or more gas outlet orifices 35, 36, arranged in the vicinity of the cover or on the cover 30, and through which gas bubbles can be evacuated when filling the sponge 32. The filling of the sponge 32 through its base 31 under the effect of the capillarity in fact creates a pressurization within the DEL, which drives the bubbles toward the cover 30.

At the base 31 of the DEL, a base grating 37 separates the sponge 32 from the liquid extraction orifice 12.

With regard to the capillary structure itself, called sponge 32, it schematically consists, in a first exemplary embodiment illustrated by FIG. 5, of a matrix of juxtaposed cells 38 produced within a single-piece three-dimensional volume.

In this FIG. 5, the form of the sponge is parallelepipedal, but it is clear that this sponge principle can be adapted to a tapered form as described in FIGS. 3 and 4, for example by organizing cells around a central axis, by a system with symmetry of revolution.

In this exemplary embodiment, given as a nonlimiting example, the sponge consists of a three-dimensional lattice 38 formed by wire elements, the base cell 39, also called cell, of said lattice being of substantially cubic form (see FIG. 6A). The lattice is formed by the edges of the cubic cells. The wire elements are here of circular section. The dimension Di of the edges of the cells (see FIG. 6B) in the direction at right angles to the flow of the liquid (plane XY) decreases when moving in the direction of flow of the liquid (axis Z), which creates a positive capillary gradient in this direction. Advantageously, the dimension Hi of the edges parallel to the direction of flow of the liquid also decreases when moving in the direction of flow of the fluid.

Figure 7:
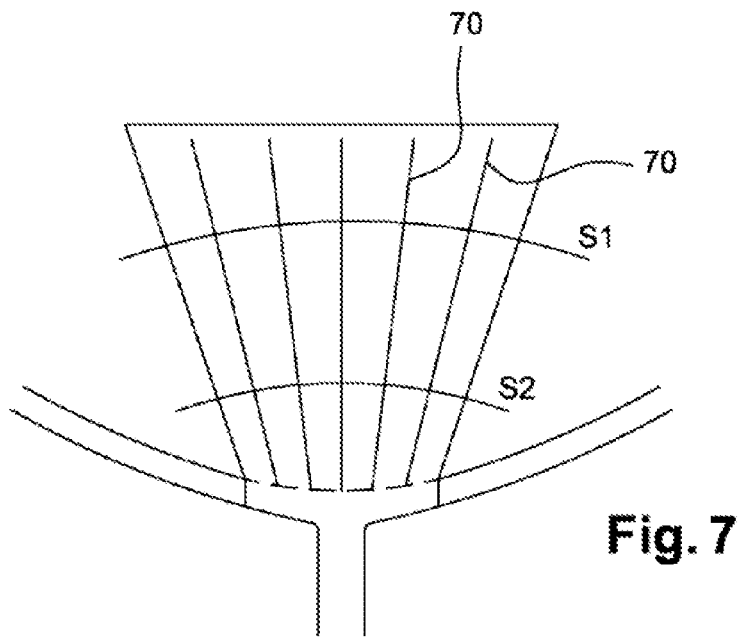
FIG. 7: a simplified diagram seen in cross section of a liquid expulsion device in a second embodiment of the invention.

FIGS. 7 and 8 show other cross-sectional schematic views of a sponge 32 made up of a set of wire elements 70 arranged within a housing which is here of rectangular section, these wire elements 70 being linked by spacers 71 producing a mechanical function and a function of securing the wire elements.

Figure 8A:
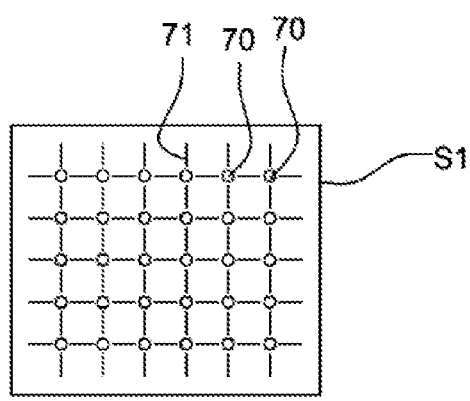
FIG. 8: a diagram showing a local cross section of the wire elements on two cross-sectional surfaces at right angles to said elements in this same second embodiment of the invention.
Figure 8B:
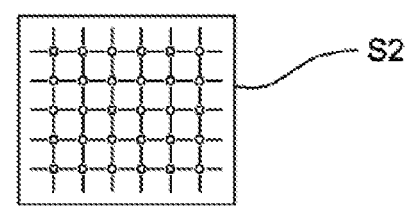

As can be seen in FIGS. 8A and 8B, which represent, to the same scale, cross-sectional views of the sponge 32 at the levels S1 and S2, the wire elements are arranged according to a square matrix, and linked by spacers 71 describing the sides of these squares. In the direction of approach to the bottom part of the sponge (according to FIG. 7), the wire elements 70 become closer together, which creates a capillary gradient in a desired direction.

FIG. 9A illustrates another meshing of the wire elements 70, here distributed according to a hexagonal paving. In this example, the sections of the wire elements have been chosen to be in "Y" form (see FIG. 9B), the branches of the "Y" extending along the sides of the hexagonal meshing.

FIG. 10 illustrates the form of the liquid-gas interface observed between the wire elements 70, the liquid phase here being at the bottom of the figure, the wire elements converging toward the bottom in accordance with FIGS. 8A and 8B. A value characteristic of the capillarity at this interface is given by the radius of curvature of the separation surface between liquid and gas. When moving in the direction of flow of the liquid (here downward), because the wire elements converge toward one another, the radius of curvature of the liquid-gas separation surface, that is to say the capillarity, will increase, hence a positive capillary gradient in the direction of flow of the liquid.

In a particular embodiment illustrated by FIG. 11A, the wire elements 70 are linked together by spacers 71 arranged in the so-called "vertical" planes XZ and YZ, the spacers not being at right angles to the wire elements 70, but, on the contrary, forming with them an angle close to 45°.

In a variant embodiment conforming to FIG. 11B, the spacers 71 are of openwork plate type, in which the edges are also inclined at approximately 45° from the wire elements 70.

Figure 12:
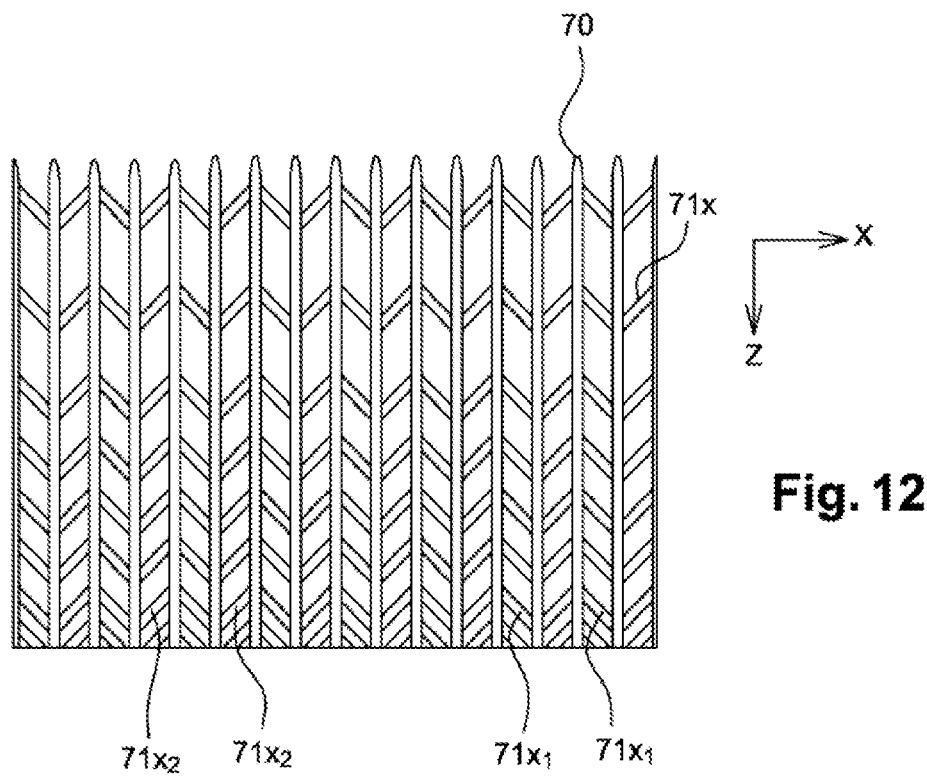
FIG. 12: a side view of a sponge according to an embodiment of the invention.
Figure 13:
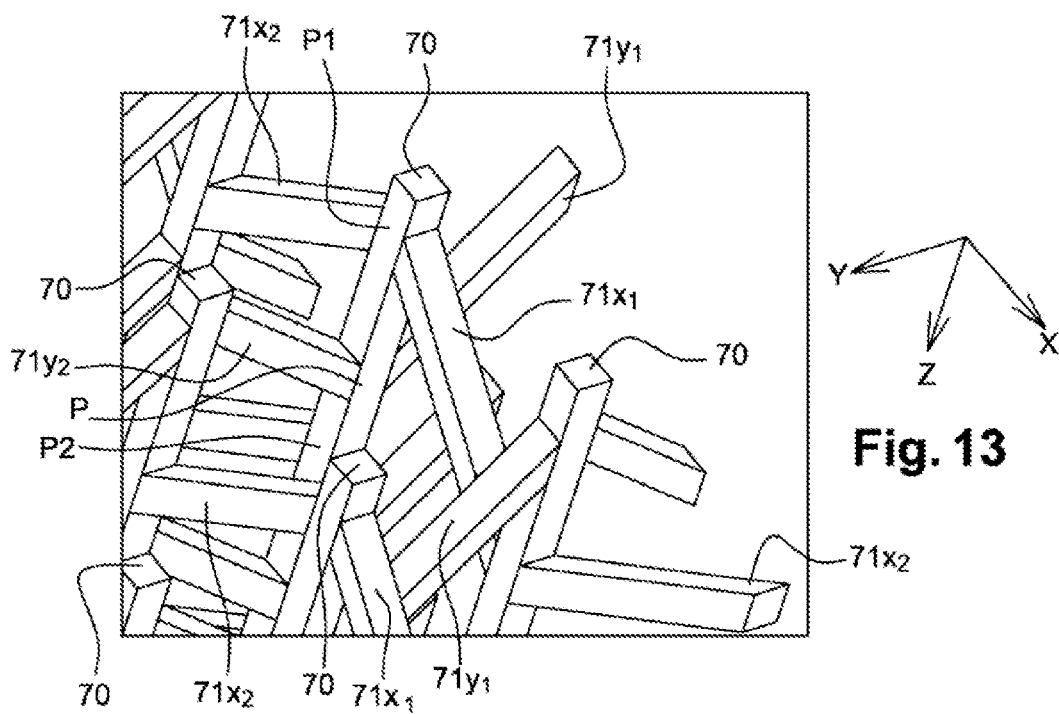
FIG. 13: a perspective view corresponding to the device of FIG. 12.

In a preferred embodiment, illustrated by FIGS. 12 and 13, the wire elements 70 are rectilinear, substantially parallel to one another and oriented in a same direction of capillary gradient Z, such that they converge when moving in the direction of the capillary gradient, and the spacers, arranged between these wire elements, in the so-called "vertical" planes XZ and YZ, are not at right angles to the wire elements 70, but, on the contrary, form with them an angle close to 45°.

In the preferred embodiment, as illustrated in FIG. 12, the spacers corresponding to a same layer of cells form superposed broken lines.

For example, in the vertical plane XZ, called longitudinal, with a same "height" in the direction of capillary gradient Z, one longitudinal spacer in every two is oriented in the direction +X+Z (spacers $71_{X1}$ in FIG. 12) and one longitudinal spacer in every two is oriented in the direction +X−Z (spacers $71_{X2}$ in FIG. 12).

The same applies in the vertical plane YZ, called lateral: with a same "height" in the direction of capillary gradient Z, one lateral spacer in every two is oriented in the direction +Y+Z (spacers $71_{Y1}$ in FIG. 13) and one lateral spacer in every two is oriented in the direction +X−Z (spacers $71_{Y2}$ in FIG. 13).

This arrangement can be better seen in FIG. 13 which illustrates, by isometric perspective, five wire elements 70, and a set of longitudinal spacers $71_X$ and lateral spacers $71_Y$ linking these wire elements.

As can be seen in this figure, in the present embodiment, described here by way of example, the longitudinal spacers $71_X$ and the lateral spacers $71_Y$ are not attached at the same height to the wire elements 70. On the contrary, each lateral spacer $71_Y$ is attached to a wire element 70 (for example at a point denoted P in FIG. 13) substantially at mid-distance between the fixing points P1, P2 of the two most adjacent longitudinal spacers $71_X$.

In an exemplary embodiment, for a DEL with a capacity of approximately one liter of liquid, the current DELs have volumes from 1 to 5 L for characteristic dimensions of 10 to 30 cm, with spaces between wire elements of from a few tens of a millimeter to a few millimeters (typically two millimeters), and a length between spacers which varies from five to one millimeter between the two ends of the DEL in the direction Z of capillary gradient. The dimensions depend naturally on the characteristics of the liquid which has to be stored in the tank.

The thickness of the wire elements and of the spacers is here typically between one and three tenths of a millimeter.

Manufacturing Method

The sponge is manufactured by a powder-based fast manufacturing method, for example of the type known by the name of "Selective Laser Melting" (SLM for short).

Step 100: In a preliminary step 100, a three-dimensional digital description of the part to be produced is generated and entered into the memory of an SLM machine.

Step 200: The part to be manufactured, here the sponge 32, is then broken down by software into a superposition of very thin layers. The thinness of the layers depends on the thinness demanded of the final part and on the capacity of the machine. It is typically a few tenths of a millimeter, the layers even being of the order of magnitude of a tenth of a millimeter.

Figure 14:
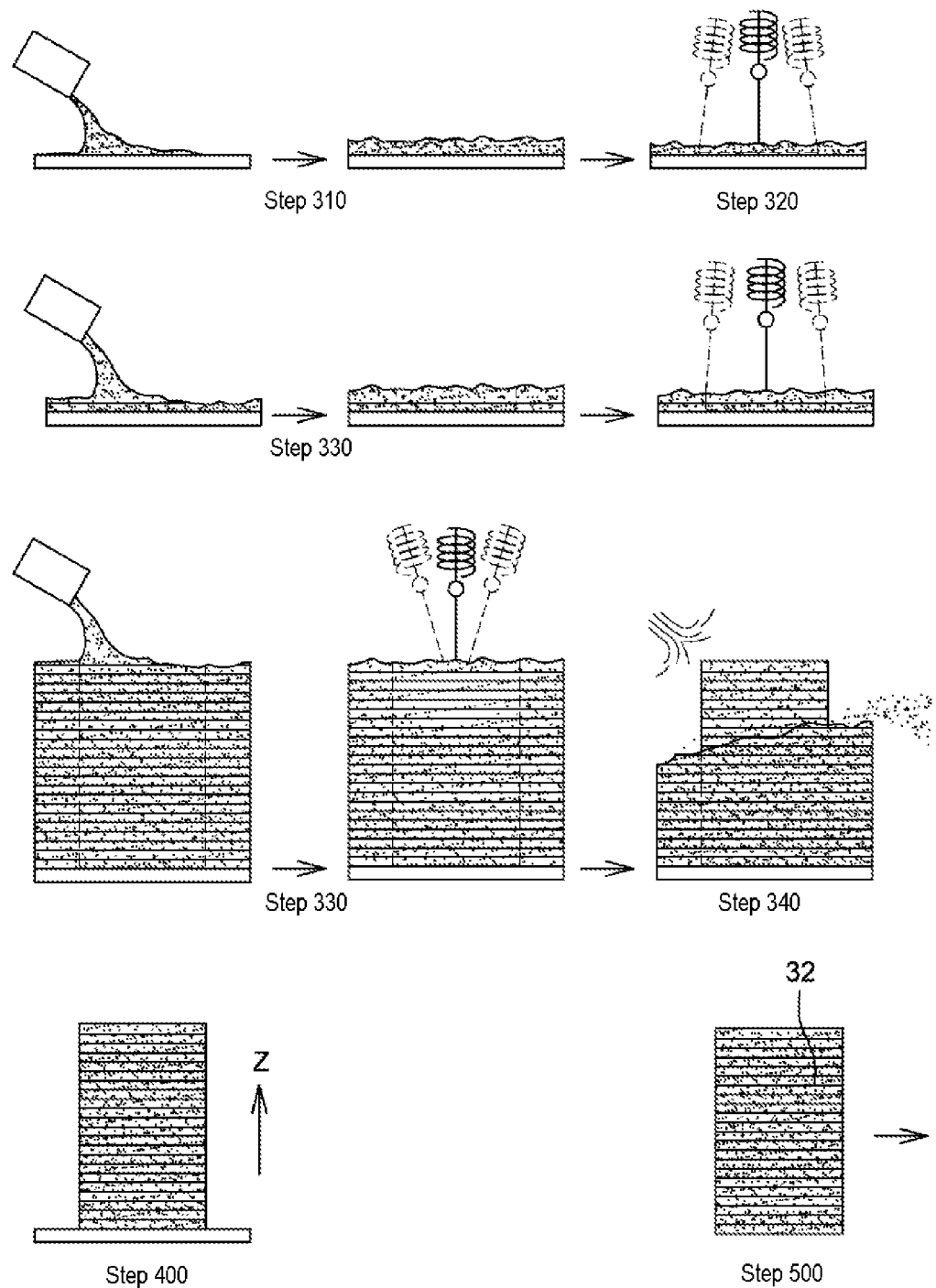
FIG. 14: a schematic illustration of the steps of an "Additive Manufacturing" method for manufacturing a device according to the invention.

Step 300: Then the sponge 32 is manufactured layer by layer. This method is illustrated by FIG. 14.

Substep 310: For the first layer, a powder of a material chosen according to the type of liquid to be stored in the tank is poured onto a planar substrate.

Two metal alloys and two plastics (procured in powder form) can notably be used in an implementation of the present method.

(1) Titanium alloy: TA6V Composition by %: Ti (bal), Al (6.15), V (4.01), C (0.0&), Fe (0.058), O (0.14), N (0.002) and H (0.002)

(2) Aluminum alloy: AlSi10Mg Composition by %: Al (bal), Si (9.89) and Mg (0.39)

(3) Polyamide: Polyamide 11

(4) PEEK: Polyetheretherketone

With regard to the choice of these products, titanium is chosen for example for the flight applications with corrosive propellant (for example NTO, MMH, N2H4), aluminum and PEEK are chosen for flight applications also but with non-corrosive or less corrosive propellants (for example NH3, C4H10, N2O), polyamide is chosen for models or functional ground prototypes.

Substep 320: Then a moving laser solidifies, by melting, the design of the part of this layer, typically the section of the wire elements and of the spacer segments, the rest of the powder being unchanged and remaining in place.

Substep 330: Then, a new layer of powder is poured onto the preceding layer, and so on, iteratively, until the final height of the sponge is reached. In the present example, the wire elements 70 are manufactured in the vertical direction Z corresponding to the direction of gravity on the ground.

Substep 340: Once the part is fully formed, the unsolidified powder is blown away or removed by any means, thus revealing the single-piece sponge.

Step 400: The sponge is then separated from its substrate.

Step 500: It is then cleaned, for example by ultrasound treatment, intended to eliminate dust or particles remaining present in the structure. In an exemplary cleaning method, the sponge 32 is subjected to five successive passes in an ultrasound cleaning device implemented by immersion in a bath of isopropyl alcohol and water.

Alternatively, other methods can be envisaged: for example, methods based on closed loop circulation of solvent fluids but also of detergents with filtration and possibly alternation with abrasive fluid recirculation.

Step 600: Finally, the sponge is inserted into a housing of suitable form, with a view to its installation in a liquid tank.

In a variant embodiment, the method comprises a heat treatment step after separation from the remaining dust, so as to reduce the mechanical stresses in the structure, linked to the manufacture.

In another variant, a surface polishing treatment is performed.

In yet another variant, the digital model of the sponge to be manufactured is complemented in its bottom part by a series of small thin vertical supporting columns, a few millimeters high. In this way, the separation from the substrate is significantly simplified, the first layer of the part being otherwise welded directly onto the substrate. This separation can, for example, be performed by sawing.

During the manufacture of a sponge of lattice type according to this method, no edge of the lattice is horizontal, notably for mechanical strength reasons.

It should be noted that, in order to generate a surface roughness favoring the wettability of the sponge (typical roughness of 20 to 50 microns), the size of the powder grains used for manufacture is of a dimension substantially equal to this roughness.

In a variant embodiment, the sponge and the housing are manufactured at the same time, by the method described above.

Variants of the Invention

According to one variant, the sponge 32 of the liquid expulsion/retention device can have a cylindrical geometry about a central axis of the tank 10, the direction of each wire element 70 converging toward a central axis, such that the capillary gradient of the cells is directed radially toward said central axis where a fluid evacuation device is located.

It can also have a geometry of sphere segment from, all the wire elements converging substantially toward one and the same point, such that the capillary gradient of the cells is directed radially toward the liquid evacuation orifice.

It may also have a substantially parallelepipedal geometry, the wire elements being mutually parallel, such that the capillary gradient of the cells is directed substantially along a same axis toward a base linked to the liquid evacuation orifice.

The invention claimed is:

1. A device for expelling/retaining a predetermined liquid and suitable for integration in a liquid tank operable at low or zero gravity, the device comprising:
a peripheral zone;
a liquid expulsion/retention zone;
a single three-dimensional structure comprising a set of wire elements spaced apart from one another and extending between the peripheral zone and the liquid expulsion/retention zone, and a set of spacers intersecting and linking the wire elements together to form a lattice;
wherein the wire elements are substantially oriented in a direction of flow of the liquid within the device, the liquid being retained between the wire elements by capillarity;
wherein, for at least part of a surface orthogonal to the wire elements, intersections of the wire elements with an orthogonal surface are points determining sides of polygons forming a paving of the orthogonal surface; and
wherein the wire elements are linked together by spacers comprising projections, parallel to a direction of the wire elements, on the surface orthogonal to the wire elements merged with the sides of the polygons.

2. The device as claimed in claim 1, wherein the wire elements are arranged such that a capillary gradient of the liquid arranged within the wire elements is positive or zero in the direction of flow of the liquid from the peripheral zone to the liquid expulsion/retention zone.

3. A device for expelling/retaining a predetermined liquid and suitable for integration in a liquid tank operable at low or zero gravity, the device comprising:
a peripheral zone;
a liquid expulsion/retention zone;
a single three-dimensional structure comprising a set of wire elements spaced apart from one another and extending between the peripheral zone and the liquid expulsion/retention zone, and a set of spacers intersecting and linking the wire elements together to form a lattice;

wherein the wire elements are substantially oriented in a direction of flow of the liquid within the device, the liquid being retained between the wire elements by capillarity; and wherein the spacers are wholly or partly substantially wire-like structural elements, and the spacers are not orthogonal to the wire elements, an angle between the spacers and the wire elements is between 20° and 70°.

4. The device as claimed in claim 1, wherein said spacers are arranged to reduce inducement of capillary peaks occurring along the wire elements where the spacers are located.

5. The device as claimed in claim 1, wherein the spacers are wholly or partly substantially wire-like structural elements.

6. The device as claimed in claim 3, wherein, for at least part of a surface orthogonal to the wire elements, intersections of the wire elements with an orthogonal surface are points determining sides of polygons forming a paving of the orthogonal surface.

7. The device as claimed in claim 1, further comprising zones in which the spacers are substantially wire-like, a distance between two consecutive spacers in the zones decreases when moving in the direction of the flow of the liquid from the peripheral zone to the liquid expulsion/retention zone.

8. The device as claimed in claim 1, wherein the wire elements comprise a non-convex section to enhance rigidity of the wire elements.

9. A device for expelling/retaining a predetermined liquid and suitable for integration in a liquid tank operable at low or zero gravity, the device comprising:
   a peripheral zone;
   a liquid expulsion/retention zone;
   a single three-dimensional structure comprising a set of wire elements spaced apart from one another and extending between the peripheral zone and the liquid expulsion/retention zone, and a set of spacers intersecting and linking the wire elements together to form a lattice;
   wherein the wire elements are substantially oriented in a direction of flow of the liquid within the device, the liquid being retained between the wire elements by capillarity;
   wherein, for at least part of a surface orthogonal to the wire elements, intersections of the wire elements with an orthogonal surface are points determining sides of polygons forming a paving of the orthogonal surface; and
   wherein the wire elements comprise a non-convex section to enhance rigidity of the wire elements, the section comprising protuberances extending along the sides of the polygons forming a polygonal paving of a network of the wire elements.

10. The device as claimed in claim 1, wherein the single three-dimensional structure is manufactured from a single piece according to a rapid manufacture method.

11. The device as claimed in claim 1, wherein the device is manufactured from a single piece according to a fast powder-based manufacturing method.

12. A satellite comprises a device as claimed in claim 1.

13. The device as claimed in claim 3, wherein the wire elements are arranged such that a capillary gradient of the liquid arranged within the wire elements is positive or zero in the direction of flow of the liquid from the peripheral zone to the liquid expulsion/retention zone.

14. The device as claimed in claim 3, wherein said spacers are arranged to minimize inducement of capillary peaks occurring along the wire elements where the spacers are located.

15. The device as claimed in claim 3, further comprising zones in which the spacers are substantially wire-like, a distance between two consecutive spacers in the zones decreases when moving in the direction of the flow of the liquid from the peripheral zone to the liquid expulsion/retention zone.

16. The device as claimed in claim 3, wherein the wire elements comprise a non-convex section to enhance rigidity of the wire elements.

17. The device as claimed in claim 3, wherein the single-piece three-dimensional structure is manufactured from a single piece according to a rapid manufacture method.

18. The device as claimed in claim 3, wherein the device is manufactured from a single piece according to a fast powder-based manufacturing method.

19. A satellite comprises a device as claimed in claim 3.

20. The device as claimed in claim 9, wherein the wire elements are arranged such that a capillary gradient of the liquid arranged within the wire elements is positive or zero in the direction of flow of the liquid from the peripheral zone to the liquid expulsion/retention zone.

21. The device as claimed in claim 9, wherein said spacers are arranged to minimize inducement of capillary peaks occurring along the wire elements where the spacers are located.

22. The device as claimed in claim 9, further comprising zones in which the spacers are substantially wire-like, a distance between two consecutive spacers in the zones decreases when moving in the direction of the flow of the liquid from the peripheral zone to the liquid expulsion/retention zone.

23. The device as claimed in claim 9, wherein the single-piece three-dimensional structure is manufactured from a single piece according to a rapid manufacture method.

24. The device as claimed in claim 9, wherein the device is manufactured from a single piece according to a fast powder-based manufacturing method.

25. A satellite comprises a device as claimed in claim 9.

* * * * *